(12) United States Patent
van Houtum

(10) Patent No.: US 9,838,100 B2
(45) Date of Patent: Dec. 5, 2017

(54) BEAM FORMING WITH DOUBLE-NULL-STEERING FOR IN-BAND ON-CHANNEL RECEPTION

(71) Applicant: NXP B.V., Eindhoven (NL)

(72) Inventor: Wim van Houtum, Son en Breugel (NL)

(73) Assignee: NXP B.V., Eindhoven (NL)

( * ) Notice: Subject to any disclaimer, the term of this patent is extended or adjusted under 35 U.S.C. 154(b) by 18 days.

(21) Appl. No.: 14/546,576

(22) Filed: Nov. 18, 2014

(65) Prior Publication Data
US 2016/0142119 A1 May 19, 2016

(51) Int. Cl.
| | | |
|---|---|---|
| H04K 1/10 | (2006.01) | |
| H04L 27/28 | (2006.01) | |
| H04B 7/06 | (2006.01) | |
| H04B 1/10 | (2006.01) | |

(52) U.S. Cl.
CPC .......... *H04B 7/0617* (2013.01); *H04B 1/1036* (2013.01)

(58) Field of Classification Search
CPC .......................... H04L 27/2647; H04L 5/0007
See application file for complete search history.

(56) References Cited

U.S. PATENT DOCUMENTS

| | | | | |
|---|---|---|---|---|
| 6,430,724 B1* | 8/2002 | Laneman | ............... | H04H 20/30 |
| | | | | 714/780 |
| 2003/0202568 A1* | 10/2003 | Choi | .................. | H04B 1/71075 |
| | | | | 375/148 |
| 2007/0021085 A1* | 1/2007 | Kroeger | ................. | H04B 7/086 |
| | | | | 455/272 |
| 2009/0103593 A1* | 4/2009 | Bergamo | ............... | H04B 1/707 |
| | | | | 375/146 |
| 2010/0233988 A1* | 9/2010 | Kon | ...................... | H04B 1/1027 |
| | | | | 455/326 |
| 2012/0033761 A1* | 2/2012 | Guo | ........................ | G01S 3/023 |
| | | | | 375/316 |

(Continued)

OTHER PUBLICATIONS

Air Interface Design Description Layer 1 FM, Doc. No. SY_TN_1011sG Rev.G, Aug. 23, 2011.

(Continued)

*Primary Examiner* — Shuwang Liu
*Assistant Examiner* — Gina McKie

(57) ABSTRACT

Various exemplary embodiments relate to a method for improving reception of transmissions with first adjacent interference signals, the method including selecting one or more time samples from each of two or more antennas; generating a lower first adjacent interference (LFAI) signal, a desired signal, and an upper first adjacent interference (UFAI) signal for each of the time samples; calculating a lower weighting co-efficient based on the LFAI signal; calculating a middle weighting co-efficient based on the desired signal; calculating a upper weighting co-efficient based on the UFAI signal; combining the lower weighting co-efficient with a filtered LFAI signal into a weighted lower signal; combining the middle weighting co-efficient with a filtered desired signal into a weighted middle signal; combining the upper weighting co-efficient with a filtered UFAI signal into a weighted upper signal; and combining the weighted lower signal, the weighted middle signal, and the weighted upper signal.

17 Claims, 9 Drawing Sheets

(56) References Cited

U.S. PATENT DOCUMENTS

2012/0189070 A1* 7/2012 Kroeger .............. H04L 27/2623
375/260
2015/0303956 A1* 10/2015 Kroeger ............... H04B 1/1036
375/350

OTHER PUBLICATIONS

In band/on-channel Digital Radio Broadcasting Standard, NRSC-5-C, Sep. 2011.
Van Trees, H.,"Optimum Array Processing", Wiley-Interscience, 2002.

* cited by examiner

BEAM FORMING WITH DOUBLE-NULL-STEERING FOR IN-BAND ON-CHANNEL RECEPTION

TECHNICAL FIELD

The "In-band on-channel" (IBOC) radio transmission system is generally used to transmit digital radio and analog radio broadcast signals simultaneously on the same frequency. There is also an all-digital version in which two digital signals are combined.

BACKGROUND

The IBOC system multiplexes digital information by utilizing additional digital subcarriers or sidebands, thus avoiding re-allocation of broadcast bands. However, by putting RF energy outside of the normally-defined channel, interference is increased when using digital sidebands.

SUMMARY

In light of the present need for improved reception of in-band on-channel transmissions, a brief summary of various exemplary embodiments is presented. Some simplifications and omissions may be made in the following summary, which is intended to highlight and introduce some aspects of the various exemplary embodiments, but not to limit the scope of the invention. Detailed descriptions of a preferred exemplary embodiment adequate to allow those of ordinary skill in the art to make and use the inventive concepts will follow in later sections.

Various exemplary embodiments relate to a method for improving reception of transmissions with first adjacent interference signals, the method including selecting one or more time samples from each of two or more antennas; generating a lower first adjacent interference (LFAI) signal, a desired signal, and an upper first adjacent interference (UFAI) signal for each of the time samples; calculating a lower weighting co-efficient based on the LFAI signal; calculating a middle weighting co-efficient based on the desired signal; calculating a upper weighting co-efficient based on the UFAI signal; combining the lower weighting co-efficient with a filtered LFAI signal into a weighted lower signal; combining the middle weighting co-efficient with a filtered desired signal into a weighted middle signal; combining the upper weighting co-efficient with a filtered UFAI signal into a weighted lower signal; and combining the weighted lower signal, the weighted middle signal, and the weighted upper signal.

In some embodiments of the method, calculating the lower weighting co-efficient based on the LFAI signal further includes shifting the LFAI signal to zero; and calculating the upper weighting co-efficient based on the UFAI signal further includes shifting the UFAI signal to zero. In some embodiments of the method, calculating the lower weighting co-efficient based on the LFAI signal further includes filtering the LFAI signal to include the lowest half of the LFAI signal; calculating a middle weighting co-efficient based on the desired signal further includes filtering the desired signal to include the middle portion of the desired signal which includes half the desired signal; and calculating the upper weighting co-efficient based on the UFAI signal further includes filtering the UFAI signal to include the upper-most half of the LFAI signal.

In some embodiments of the method, calculating the lower weighting co-efficient based on the LFAI signal further includes generating an inverse co-variance matrix based on the LFAI signal; calculating a middle weighting co-efficient based on the desired signal further includes generating an inverse co-variance matrix based on the desired signal; and calculating the upper weighting co-efficient based on the UFAI signal further includes generating an inverse co-variance matrix based on the UFAI signal. In some embodiments of the method, calculating the lower weighting co-efficient based on the LFAI signal further includes calculating a lower weighting co-efficient that maximizes the Signal-to-Interference-plus-Noise-Ratio (SINR) of the LFAI signal; calculating a middle weighting co-efficient based on the desired signal further includes calculating a middle weighting co-efficient that maximizes the SINR of the desired signal; and calculating the upper weighting co-efficient based on the UFAI signal further includes calculating an upper weighting co-efficient that maximizes the SINR of the UFAI signal.

Alternative embodiments of the method further include generating a filtered LFAI signal; generating a filtered desired signal; and generating a filtered UFAI signal. In some embodiments of the method, generating the filtered LFAI signal further includes shifting the LFAI signal to zero; and generating the filtered UFAI signal further includes shifting the UFAI signal to zero. In some embodiments of the method, generating the filtered LFAI signal further includes filtering the LFAI signal to include a lower digital sideband; generating the filtered desired signal further includes filtering the desired signal to include an analog band; and generating the filtered UFAI signal further includes filtering the UFAI signal to include an upper digital sideband.

Various exemplary embodiments relate to a device for improving reception of transmissions with first adjacent interference signals, the device including an antenna array including two or more antennas; a radio front-end block including one or more radio front ends connected to each of the two or more antennas; one or more analog-to-digital converters connected to the one or more radio front-ends; one or more baseband blocks connected to the one or more analog-to-digital converters; and a digital adaptive beamformer block connected to each of the one or more baseband blocks. In some embodiments, the digital adaptive beamformer block further includes a training block connected to each of the one or more baseband blocks; a coefficient-update block connected to the training block; one or more finite impulse response (FIR) filter blocks connected to the coefficient-update block and each of the one or more baseband blocks; and a combiner block connected to each of the one or more FIR filter blocks.

In some embodiments, the one or more baseband blocks is configured to select one or more time samples from each of the two or more antennas; the training block is configured to generate a lower first adjacent interference (LFAI) signal for each of the time samples, generate a desired signal for each of the time samples, and generate an upper first adjacent interference (UFAI) signal for each of the time samples; and the coefficient-update block is configured to calculate a lower weighting co-efficient based on the LFAI signal, calculate a middle weighting co-efficient based on the desired signal, and calculate a upper weighting co-efficient based on the UFAI signal. In some embodiments, the coefficient-update block is further configured to generate an inverse co-variance matrix based on the LFAI signal, generate an inverse co-variance matrix based on the desired signal, and generate an inverse co-variance matrix based on the UFAI signal. In some embodiments, the coefficient-update block is further configured to calculate a lower weighting co-efficient that maximizes the Signal-to-Interference-plus-Noise-Ratio (SINR) of the LFAI signal, calculate a middle weighting co-efficient that maximizes the SINR of the desired signal, and calculate an upper weighting co-efficient that maximizes the SINR of the UFAI signal.

In some embodiments, the one or more finite impulse response (FIR) filter blocks is configured to generate a filtered lower first adjacent interference (LFAI) signal, generate a filtered desired signal, and generate a filtered upper first adjacent interference (UFAI) signal. In some embodiments, the one or more finite impulse response (FIR) filter blocks is further configured to shift the LFAI signal to zero, and shift the UFAI signal to zero. In some embodiments, the one or more finite impulse response (FIR) filter blocks is further configured to filter the LFAI signal to include a lower digital sideband, filter the desired signal to include an analog band, and filter the UFAI signal to include an upper digital sideband. In some embodiments, the one or more finite impulse response (FIR) filter blocks is further configured to combine a lower weighting co-efficient with the filtered LFAI signal into a weighted lower signal, combine a middle weighting co-efficient with the filtered desired signal into a weighted middle signal, and combine the upper weighting co-efficient with the filtered UFAI signal into a weighted lower signal.

In some embodiments, the one or more baseband blocks is configured to select one or more time samples from each of the two or more antennas; the training block is configured to generate a lower first adjacent interference (LFAI) signal for each of the time samples, generate a desired signal for each of the time samples, and generate an upper first adjacent interference (UFAI) signal for each of the time samples; the coefficient-update block is configured to calculate a lower weighting co-efficient based on the LFAI signal, calculate a middle weighting co-efficient based on the desired signal, and calculate a upper weighting co-efficient based on the UFAI signal; the one or more finite impulse response (FIR) filter blocks is configured to generate a filtered LFAI signal, generate a filtered desired signal, generate a filtered UFAI signal, combine the lower weighting co-efficient with the filtered LFAI signal into a weighted lower signal, combine the middle weighting co-efficient with the filtered desired signal into a weighted middle signal, combine the upper weighting co-efficient with the filtered UFAI signal into a weighted lower signal; and the combiner block is configured to combine the weighted lower signal, the weighted middle signal, and the weighted upper signal.

In some embodiments, the one or more baseband blocks configured to select one or more time samples from each of the two or more antennas; the digital adaptive beam-former block configured to generate a lower first adjacent interference (LFAI) signal, a desired signal, and an upper first adjacent interference (UFAI) signal for each of the time samples; calculate a lower weighting co-efficient based on the LFAI signal; calculate a middle weighting co-efficient based on the desired signal; calculate a upper weighting co-efficient based on the UFAI signal; combine the lower weighting co-efficient with a filtered LFAI signal into a weighted lower signal; combine the middle weighting co-efficient with a filtered desired signal into a weighted middle signal; combine the upper weighting co-efficient with a filtered UFAI signal into a weighted lower signal; and combine the weighted lower signal, weighted middle signal, and weighted lower signal.

It should be apparent that, in this manner, various exemplary embodiments enable improved reception of in-band on-channel transmissions. In particular, by training a signal processor using the lowest and highest sub-bands.

BRIEF DESCRIPTION OF THE DRAWINGS

In order to better understand various exemplary embodiments, reference is made to the accompanying drawings, wherein.

To facilitate understanding, identical reference numerals have been used to designate elements having substantially the same or similar structure and/or substantially the same or similar function.

DETAILED DESCRIPTION

Figure 1:
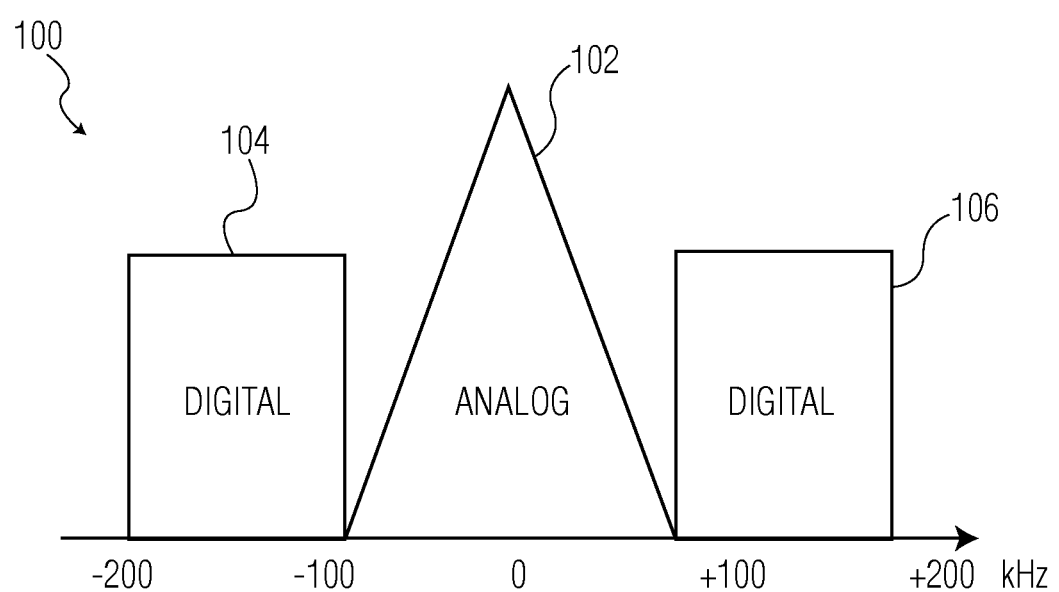
FIG. 1 illustrates an exemplary down-converted hybrid signal in simplified form.

The description and drawings presented herein illustrate various principles. It will be appreciated that those skilled in the art will be able to devise various arrangements that, although not explicitly described or shown herein, embody these principles and are included within the scope of this disclosure. As used herein, the term, "or," as used herein, refers to a non-exclusive or (i.e., and/or), unless otherwise indicated (e.g., "or else" or "or in the alternative"). Additionally, the various embodiments described herein are not necessarily mutually exclusive and may be combined to produce additional embodiments that incorporate the principles described herein. Further, while various exemplary embodiments are described with regard to IBOC signal processing, it will be understood that the techniques and arrangements described herein may be implemented to facilitate reception of near-band transmissions in other types of systems that implement multiple types of data processing or data structures.

The "In-band on-channel" (IBOC) radio transmission system is used to transmit digital radio and analog radio broadcast signals simultaneously on the same frequency; in an all-digital version, two digital signals are combined—thus an IBOC signal may be in hybrid or all-digital form. The in-band on-channel digital radio broadcasting standard for the FM-band is defined by the FM-part of the NRSC-5 standard "National Radio Systems Committee (NRSC) NRSC-5-C, "In-band/on-channel Digital Radio Broadcasting Standard", September, 2011". This standard is the basis for the transmitted IBOC-signals of the digital radio corporation iBiquity™ that can be received by an HDradio™ certified receiver.

The well-known Maximal Ratio Combining (MRC) may be used to improve reception of IBOC signals within a multiple-antennas scenario, where the received-power of each antenna is controlled in such a way that it is constructively (coherently) added. However, due to the fact that MRC is, by definition, only capable of combining the power that is collected by each antenna it: i) has limited performance due to the fact that a receiving-antenna receives stronger electromagnetic waves in some directions than in others, i.e., it is a non-ideal omni-directional antenna, ii) cannot control suppression of undesired-signals, and iii) is costly since for each antenna requires a complete detection path before signal combinations can take place.

An IBOC signal includes an OFDM-signal including a central-part centered on a carrier frequency, a lower sideband below the lowest frequency of the central-part and an upper-sideband above the highest frequency of the central-part. Thus, the desired signals and the interference will be in three different frequency bands—a lower frequency interference band, a desired signal, and a higher interference frequency band.

Focusing on the location of the desired signal while suppressing the locations of origination of interference signals may allow filtering of undesired interference. As described below, an electronically steered complex base-band beam forming approach may be able to remove or significantly reduce adjacent interference signals by double-null-steering with a Uniform-Linear-Antenna-array (ULA) consisting of two isotropic antennas that are spaced by half a wave-length ($\lambda/2$) of a carrier frequency, e.g., $f_c$=100 MHz→λ≈3 m for transmissions within the FM-band. Double-null-steering exploits the fact that both the first adjacent interference signals as well as the desired IBOC-signal are separated in three different frequency-bins; the desired and interference signals are orthogonal.

For complex base-band beam forming with double-null-steering, a portion of a frequency-bin may be used to obtain representative training-signals or surrogate-signals of the desired-IBOC-signal, the lower first adjacent interference signal, and the upper first adjacent interference signal. These surrogate-signals may be used to compute optimal steering-weights based on maximization of the Signal-to-Interference-plus-Noise-Ratio (SINR). As such, where there is an interference signal the beam former may distinguish the desired signal and the interference signal using the known properties of the signals. FM signals are symmetric, so the lowest part of the lower interference signal and the highest part of the higher interference signal may be used as a training signal for the beam former/canceller; at the closest first adjacent frequency portion the interference signal may be derived and subtracted from the desired signal. Furthermore, the strongest portion of the desired signal may be used as a training signal to derive the direction (point of origin) of the desired signal to prevent self-nulling. As a result, the reception of IBOC signals may be improved by using the properties of the signals received by two antennas by reducing the effects of interference signals detected by the antennas.

The multiple antennas may form a Uniform-Linear-Antenna-array (ULA) including two isotropic antennas, with electronically steered antenna radiation-patterns. Instead of MRC, the reception of transmitted IBOC signals may be improved by steering using complex base-band signals. The electronic steering may be based on estimated phase-shifts and estimated amplitudes of multiple received signals on the ULA. Steering the radiation-pattern using complex base-band signals, phase-estimations, and amplitude-estimations may be called "electronically-steered complex base-band beam forming." Such beam forming may allow "null-steering" to suppress or remove interference signals, for example, to suppress possible 1st-adjacent interference signals for an IBOC-transmission in either the hybrid-mode or the all-digital mode. In order to improve users' experience, for example, to minimize interruption of reception or delay when seeking a desired signal, beam-forming may be conducted as quickly as possible, with the lowest latency and least complexity. Thus two antennas may be used to minimize the expense and added complexity of adding additional antennas.

Either or both of the upper adjacent and the lower adjacent signals may interfere with the digital side band of the IBOC signal, causing co-channel interference for the desired signal. Further, the neighboring signals may have more power than the desired signal, for example an interference signal may have 100 times more power than a desired signal. However, beam forming enables co-channel-interference cancellation (CIC) since the 1st adjacent interference signals which are co-channel interference signals for the digitally-modulated side-bands of an IBOC-transmission may originate from different directions. The lowest-frequency part of the IBOC signal, the central-frequency part of the IBOC signal and the upper-most frequency part of the IBOC-signal may all be used to perform low-complexity, fast beam forming with double-null-suppression. In hybrid-mode the analog central-part of the HIBOC-signal may be used and in the all-digital mode the digital central-part of the IBOC-signal may be used. Note, that phase and amplitude-estimations may be used to apply main-lobe steering and null-steering for improved reception of the digitally-modulated side-bands without actually demodulating the orthogonal frequency division multiplexing (OFDM)-signals, as shown below. Complex base-band beam forming may use specific frequency-bins to obtain training-signals or surrogate-signals in order to calculate beam forming weights for each frequency-bin. Furthermore, the computation of each weight may be based on maximizing the SINR of the desired signal. Frequency-bin based complex base-band beam-forming with maximization of the SINR results in improved reception of the desired signal.

Referring now to the drawings, in which like numerals refer to like components or steps, there are disclosed broad aspects of various exemplary embodiments.

FIG. 1 illustrates an exemplary hybrid signal 100 in simplified form and down-converted from a carrier frequency. A beam former may perform constructive or destructive addition of the signal power for 600 kHz around a baseband (0 kHz), in other words, from −300 kHz to +300 kHz. A hybrid signal 100 may be a combination of an analog signal 102 and a digitally modulated signal 104 and 106. The analog FM-signal 102 may occupy a bandwidth of 200 kHz, i.e., between −100 kHz and +100 kHz spanning the carrier frequency. The digitally-modulated signal occupies a bandwidth of approximately 200 kHz. However, the digitally-modulated signal is separated into a lower-sideband 104 and an upper-sideband 106 each with a bandwidth of approximately 100 kHz. The lower-sideband 104 may be spectrally positioned at a distance of 100 kHz below the carrier-frequency. The upper side-band 106 may be spectrally positioned at a distance of 100 kHz above the carrier-frequency.

The total power of the digitally-modulated signal 104, 106 may be approximately a factor of hundred smaller than the power of the analog host-FM-signal 102. The digitally-modulated signal may use OFDM, where the number of subcarriers may vary depending on the selected service/transmission-mode. The "channel-grid" channel-bandwidth reserved by regulation for an analog FM-signal is 200 kHz. As a consequence, the lower and upper digital OFDM-sidebands 104, 106 transmit in the 1st-adjacent lower and upper neighboring FM-channels.

An IBOC signal may also be implemented as an all-digital signal, where the analog FM-signal is replaced by a secondary digitally-modulated signal. In the all-digital mode the bandwidth of the primary digital sidebands may be fully expanded with lower-power secondary sidebands. The below description applies to both implementations, with a few adjustments. An all-digital IBOC signal has a bandwidth of roughly 400 kHz, where also in the all-digital mode approximately 100 kHz of the lower and upper adjacent channels is occupied (outside the 200 kHz "channel-grid").

As discussed above, a $1^{st}$-adjacent signal of an IBOC transmission introduces co-channel interference for the digitally modulated lower-sideband 104 and upper-sideband 106 of a signal 100. By regulation the co-channel interference can be up to a factor of hundred stronger in power than the digitally-modulated lower-sideband 104 and upper-sideband 106. Either or both of the 1st-adjacent interference signals may be present at a time, in which case the lower-sideband 104 and upper-sideband 106 are distorted by a neighbor transmission.

Figure 2A:
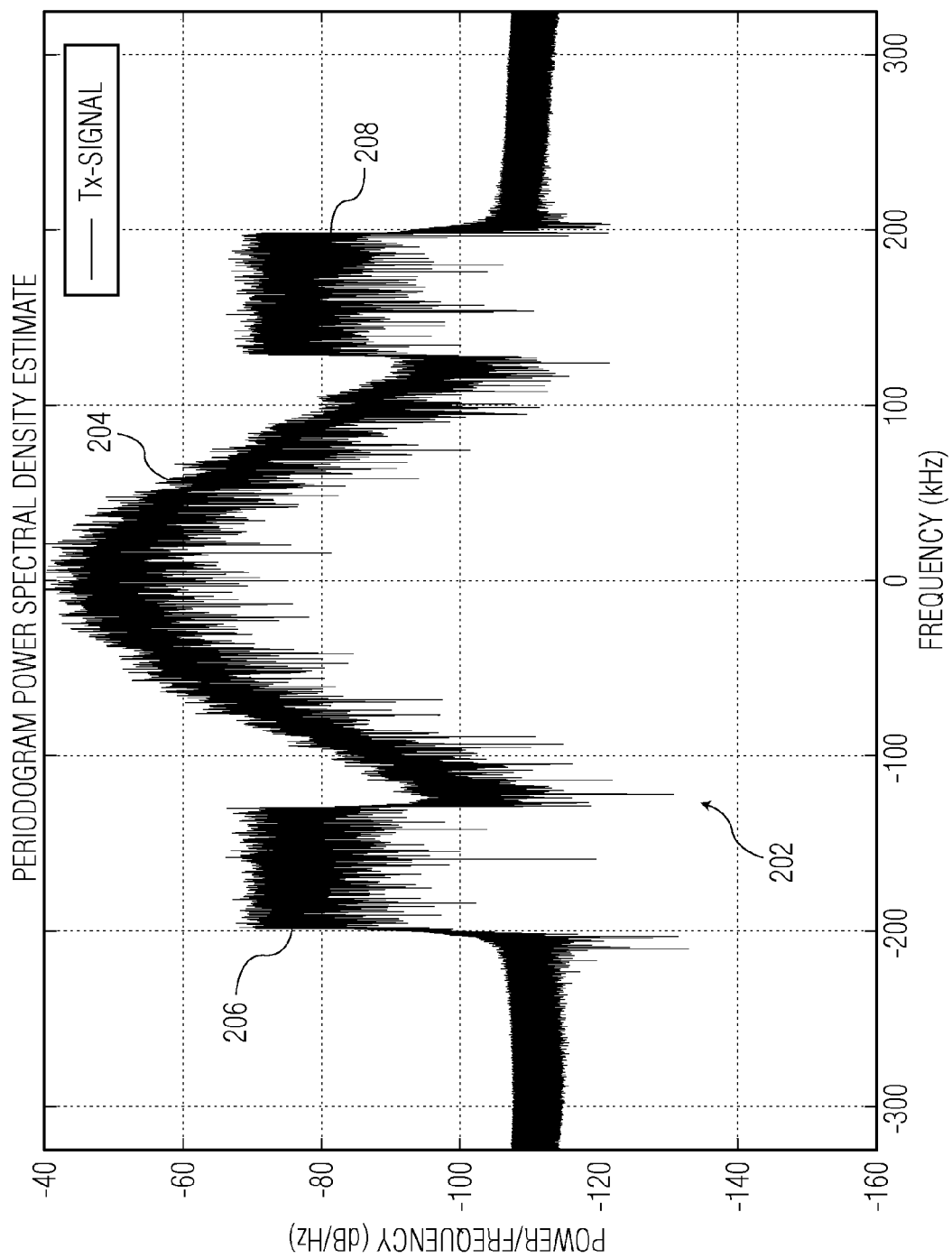
FIG. 2A illustrates an exemplary power spectral density of a desired signal.
Figure 2B:
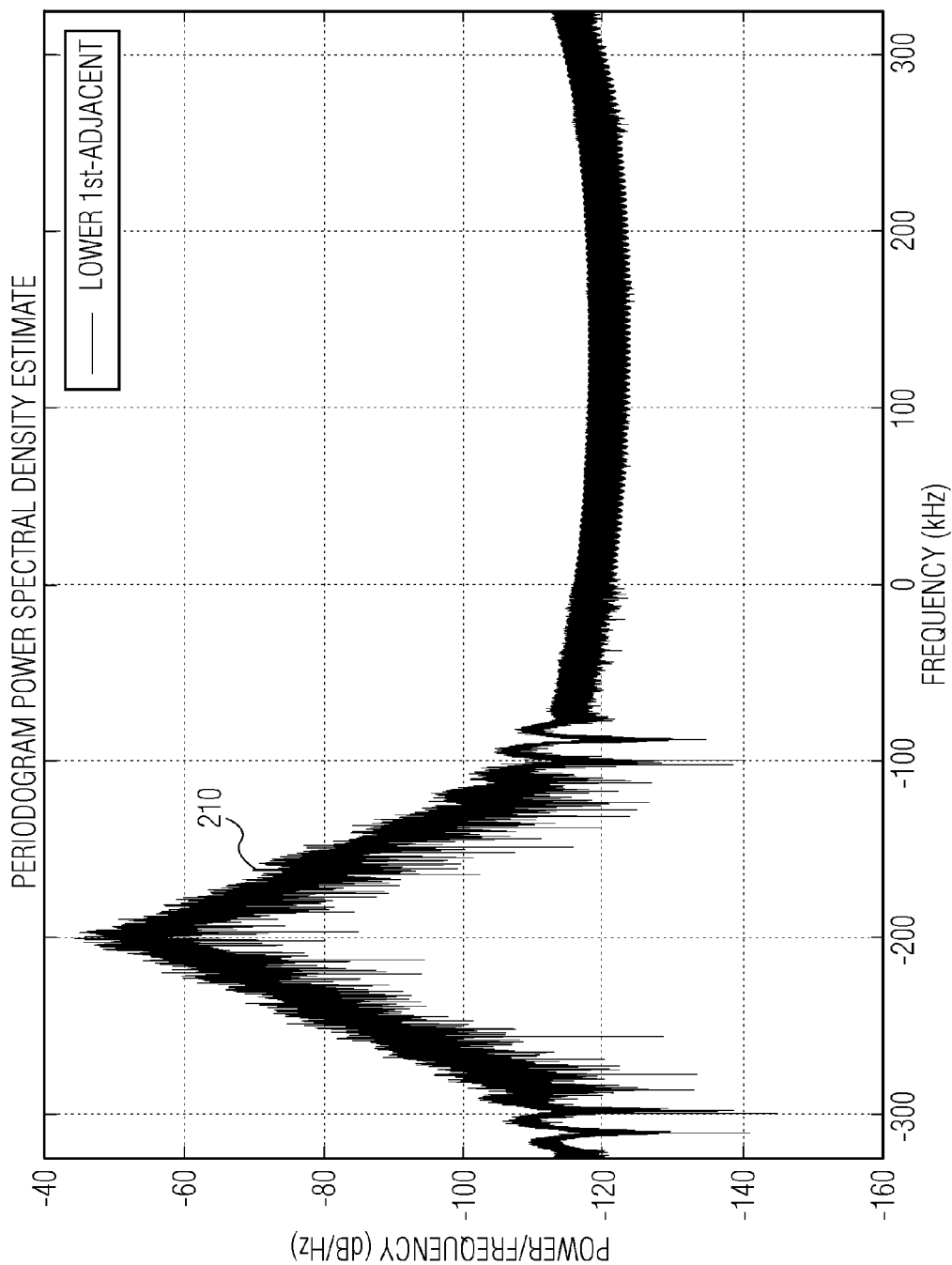
FIG. 2B illustrates an exemplary power spectral density of an interference signal.
Figure 2C:
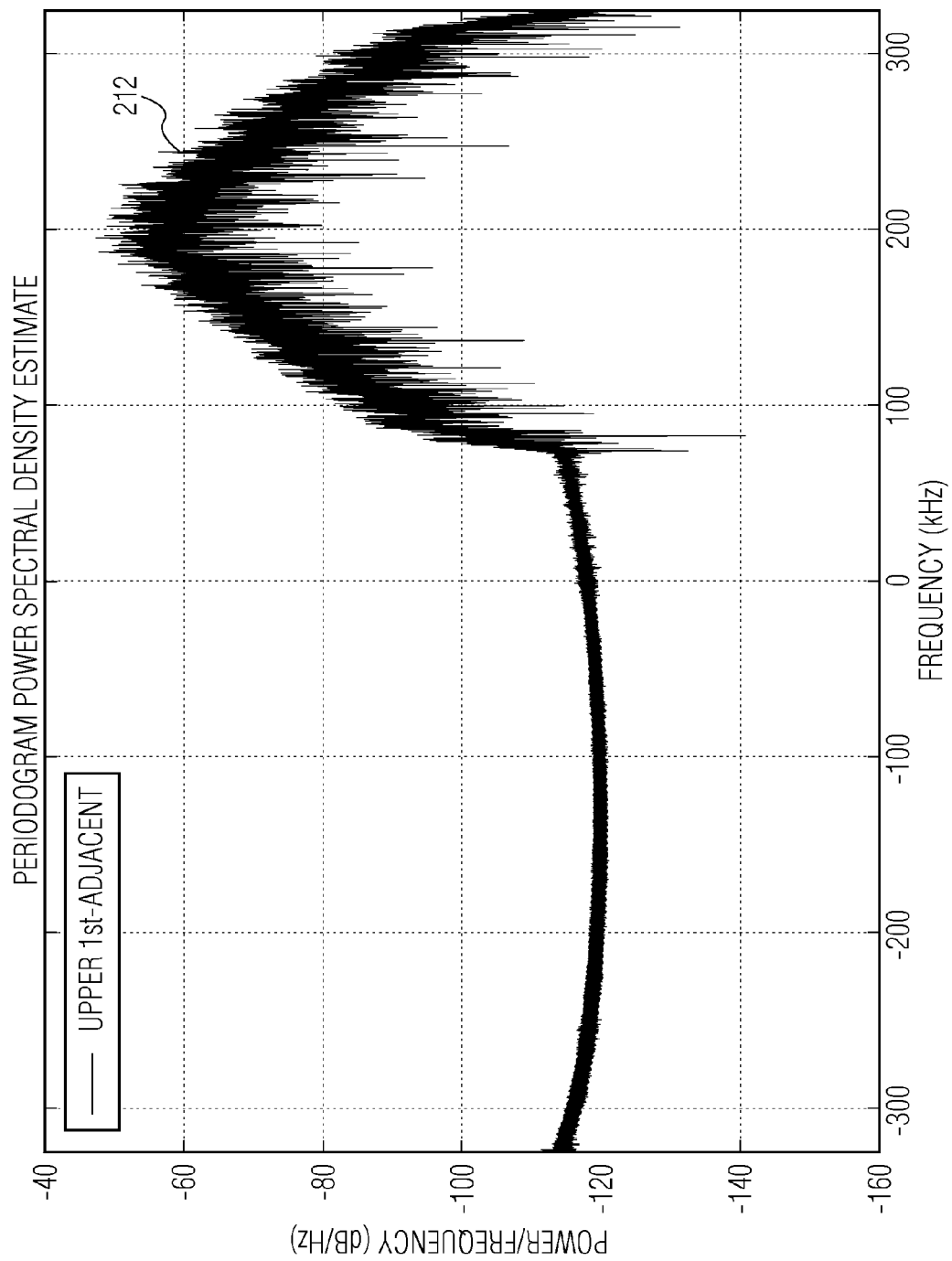
FIG. 2C illustrates an exemplary power spectral density of an interference signal.
Figure 2D:
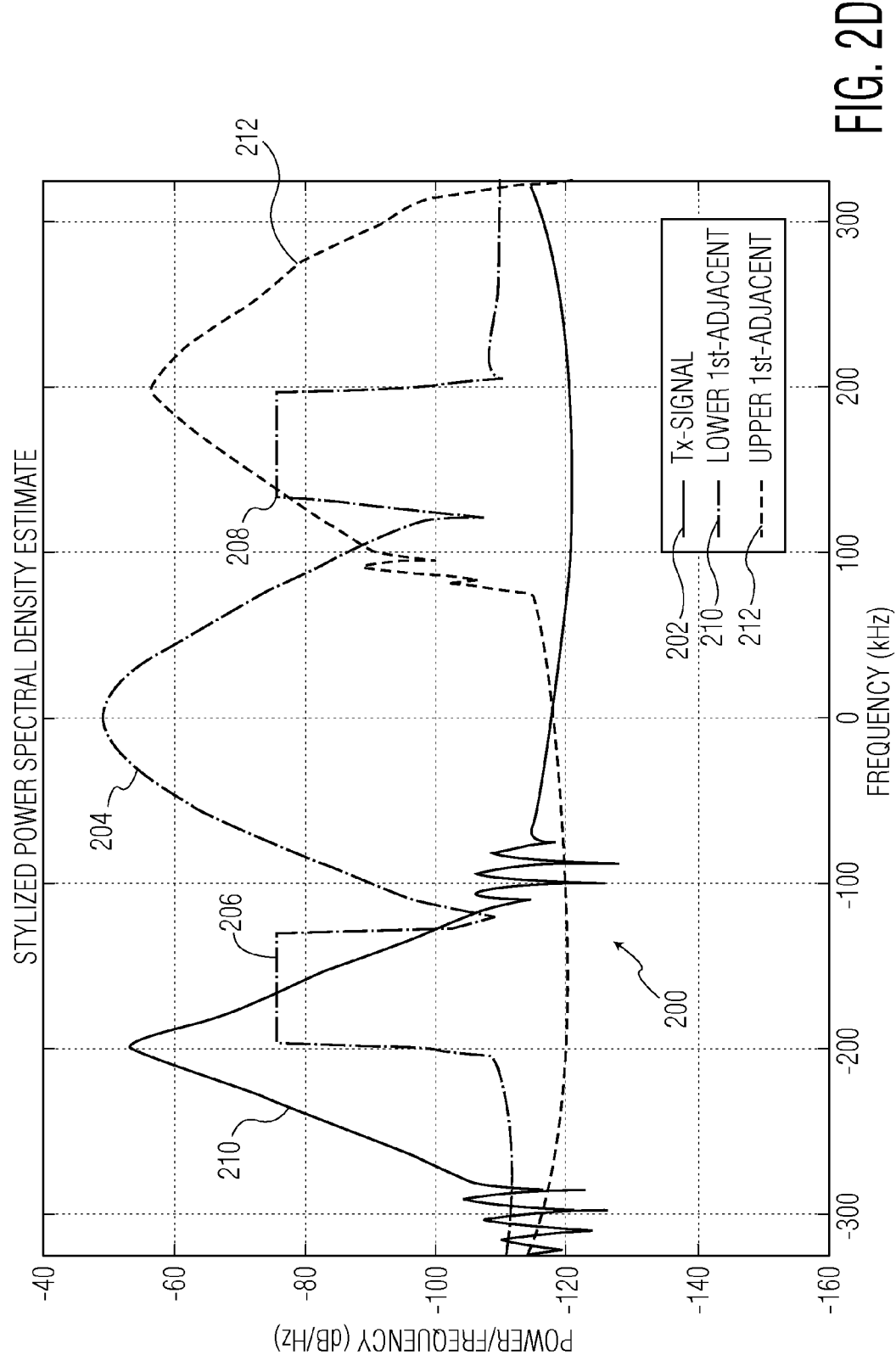
FIG. 2D illustrates a stylized exemplary power spectral density of a signal.
Figure 3:
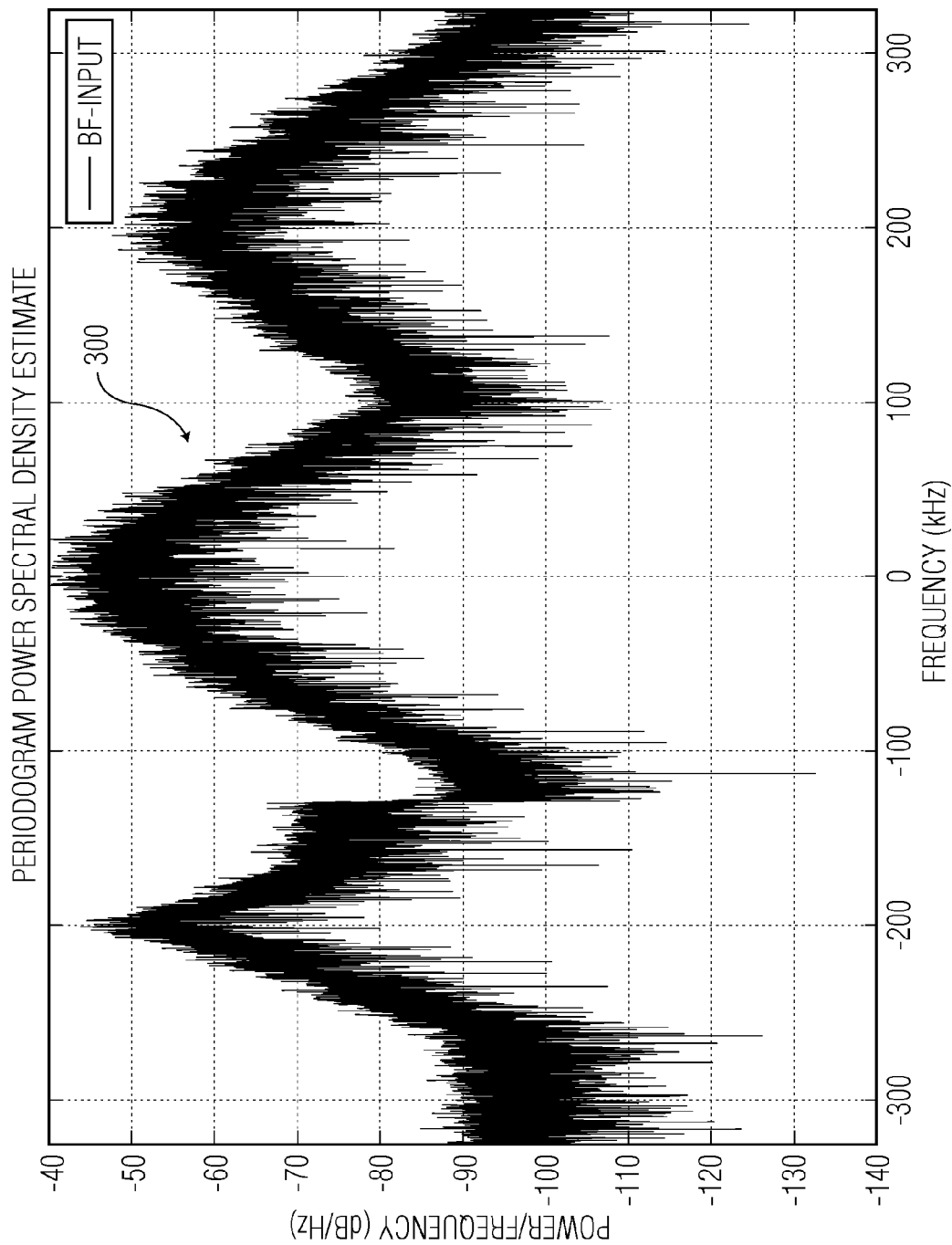
FIG. 3 illustrates an exemplary input signal for a beam forming process.

FIG. 2A illustrates an exemplary power spectral density (PSD) of a desired signal 202, with analog band 204, lower digital sideband 206, and upper digital sideband 208; FIG. 2B illustrates an exemplary PSD of a lower-sideband $1^{st}$-adjacent interference signal 210; FIG. 2C illustrates an exemplary PSD of an upper-sideband $1^{st}$-adjacent interference signal 212; and FIG. 2D illustrates a stylized exemplary PSD of an original exemplary PSD as it may be recorded, including the desired signal 202 (including analog band 204, lower digital sideband 206, and upper digital sideband 208), lower-sideband $1^{st}$-adjacent interference signal 210, and upper-sideband $1^{st}$-adjacent interference signal 212. It would be understood by one of skill in the art that FIGS. 2A, 2B, and 2C may represent the component parts of a signal that may be recorded, such that the average of the signal is represented by FIG. 2D. Thus, the hybrid IBOC signal 202 may be plotted as a noisy FM-signal. As illustrated in FIG. 3, the lower-sideband 204 and upper-sideband 206 of the IBOC-transmission 202 are heavily distorted, respectively, by the lower 1st-adjacent neighbor transmission 210 and the upper 1st-adjacent neighbor transmission 212. However, the IBOC-signal and both of the 1st-adjacent interference signals may originate from different geographic locations, thus the space-domain may be exploited by a beam forming approach to remove or reduce the 1st-adjacent interference signals.

FIG. 3 illustrates an exemplary input signal 300 for a beam forming process. Signal 300 may be the summation of a desired IBOC transmission and two 1st-adjacent transmissions after down-sampling. Electronically-steered complex base-band beam forming may be used to separate the three different signals by their different spatial information, which may be referred to as each signal's "spatial-signature". The base-band 300 of the received radio signal may occupy a bandwidth of approximately 600 kHz, i.e., between −300 kHz and +300 kHz. This received-signal may include the desired IBOC signal, occupying approximately 400 kHz between −200 kHz and +200 kHz, which may correspond to desired signal 202. Although two 1st adjacent interference signals are shown, the received-signal or input-signal 300 may include zero, one or two 1st adjacent interference signals. The 1st adjacent interference signals of signal 300 each occupy approximately 200 kHz, where the lower 1st adjacent interference-signal may be between −300 kHz and −100 kHz, which may correspond to lower-sideband $1^{st}$-adjacent interference signal 210, and the upper 1st adjacent interference-signal may be between +100 kHz and +300 kHz, which may correspond to upper-sideband $1^{st}$-adjacent interference signal 212. A 1st adjacent interference signal occupies the same frequencies as the lower-sideband and upper-sideband and thus is for the digitally-modulated lower-sideband and upper-sideband of the IBOC-signal a co-channel interference-signal.

A frequency bin that is a portion of input frequency 300 of approximately 100 kHz may be used to obtain representative training-signals for the desired IBOC signal and the lower- and upper-$1^{st}$ adjacent interference signals.

Figure 4:
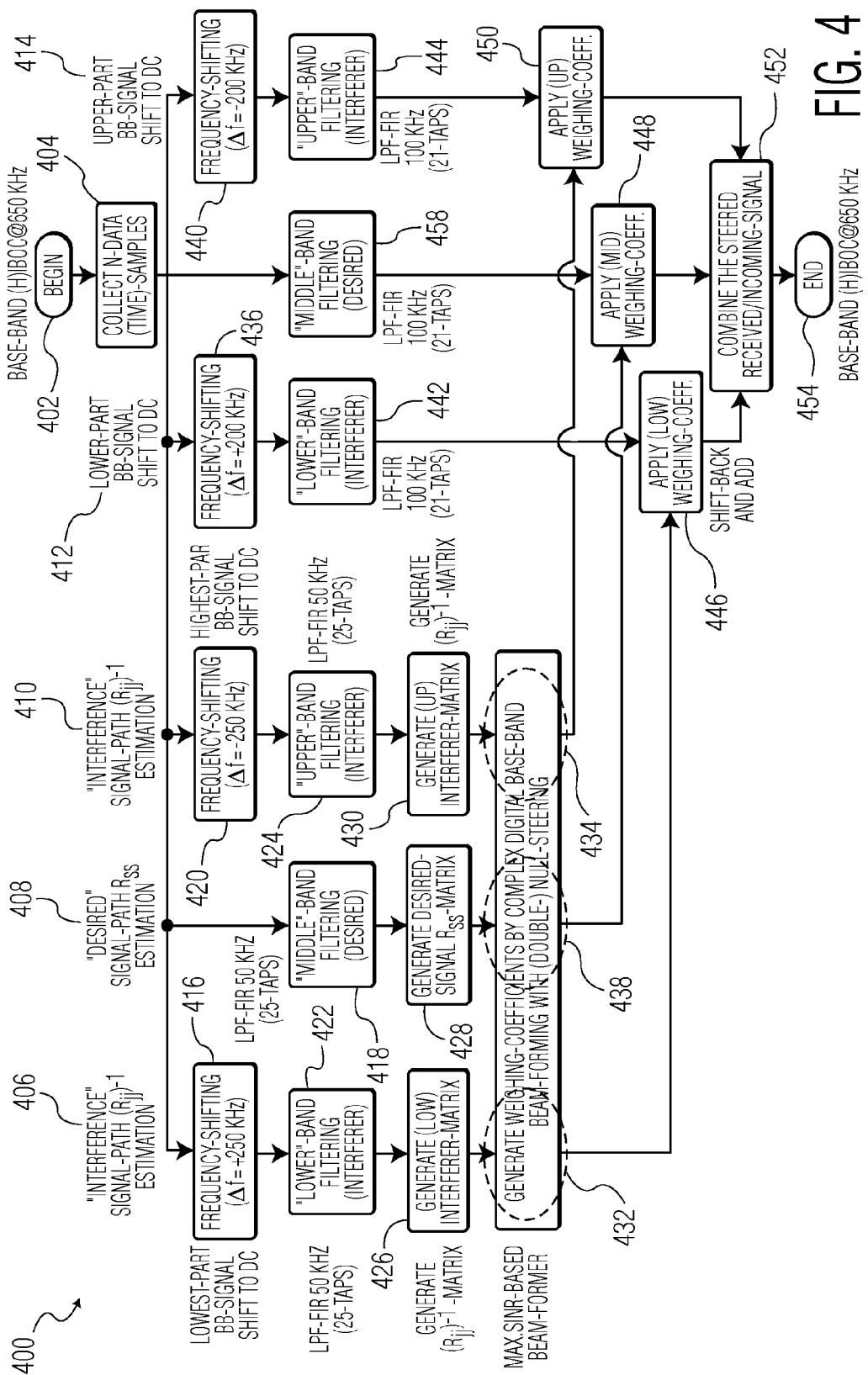
FIG. 4 illustrates an exemplary method for beam forming with double-null-steering.

FIG. 4 illustrates an exemplary method 400 for beam forming with double-null-steering. The method begins 402 where a sample frequency base band, for example, 650 kHz, may be selected and down-converted such that all of the information from a frequency domain/time domain of −325 kHz to +325 kHz may be captured. At step 404 A number N of data samples may be collected. Note that although signals 202, 210, 212, and signal 300 may be illustrative of a sample frequency, the N-data samples are time samples, rather than frequency samples. N may be a number sufficient that the training signals are effectively representative of the interference and desired signals.

For example, 2000 samples may be used to make a training signal for a frequency of 650 kHz. A person of skill in the art will understand that the length of each sample will depend on the sample frequency—for instance, in the case of 650 KHz, 1.65 micro-seconds (μs), such that 2000 samples for 650 kHz may result in, at the most, latency on the order of 3 milli-seconds (ms). Note that analog-to-digital conversion of the received signals will occur for the IBOC-rendering process; thus, no additional processing other than for writing the samples will be required to render samples as the samples are merely the digital representation of the received signal repeatedly processed (divided) into N time-samples. Thus, the sampling may be constant, so that new samples are continually available for the beam forming process. Thus, step 404 may repeat many times before moving to steps in paths 406 to 414 as discussed below. As such, the most recent N-data samples may be maintained, such that older samples may be discarded as new samples are obtained. In some embodiments, rather than constantly being updated, samples may be updated with a frequency dependent on the speed of movement of the antenna array or the interference level of the desired signal.

Further, in part due to the added complexity and processing power required, a new range for the beam former may not be calculated for every updated sample that is collected—thus, the samples may be collected more frequently than the range is updated so that the samples are available as needed when it is determined that it is time that a new range be calculated. As noted above, if no samples have been collected when a range is to be calculated (e.g. when first tuning to the frequency), the latency will be on the order of the time required to collect N samples, which may be expressed as, if recalculating at time t, the samples will be taken from t−(N*length$_{sample}$), and the beam former will not continue until N samples have been collected.

Also, in one embodiment note that the intervals between recalculation of the beam former may depend on factors such as the speed of the receiver (e.g. assuming the receiver is located on a motorized vehicle)—in theory, if the receiver is moving quickly, in an extreme case the beam former may be re-calculated for every N+1 samples (e.g. the first calculation might be run on 0-2000 samples, the second calculation might be run on 1-2001 samples). Thus, the update rate would be the same as the sample rate, but such a scenario would require significant processing capability.

As illustrated by the left-most path 406, a representative of the lower 1st adjacent interference signal, for example, signal 210, calculated from the N samples, may be obtained in the frequency-bin around −250 kHz, between −200 kHz and −300 kHz 416, where there may be little interference, for example, from the lower band 206 of the desired signal 202. In the second path 408, a representative of the desired-signal, for example, signal 202 (including 204, 206, and 208), calculated from the N samples, may be obtained in the frequency-bin around zero Hertz (0 kHz) between −50 kHz and +50 kHz 418, where there may be relatively little interference, for example, from the lower 1st adjacent interference signal 210 and the upper 1st adjacent interference signal 212. In the third path 410, a representative of the upper 1st adjacent interference signal, for example, signal 212, calculated from the N samples, may be obtained in the frequency-bin around +250 kHz, between +200 kHz and +300 kHz 420, where there may be little interference, for example, from the upper band 208 of the desired signal 202. Thus, the representative of the lower 1st adjacent interference signal, for example, signal 210, and the representative of the upper 1st adjacent interference signal, for example, signal 212, may be centered at steps 416 and 420 such that the signal is shifted to the Direct Current (DC) bias. Note that the desired frequency is shifted at step 402, so does not need to be shifted to the DC bias in subsequent steps. Thus, path 408 may proceed to step 418 from step 404, or in an alternate embodiment step 418 may wait for steps 422 and 424 to run in parallel.

At steps 422, 418 and 424, each of the representatives of the frequency-shifted lower 1st adjacent interference signal, desired signal, and frequency-shifted upper 1st adjacent interference signal may be filtered using a low-pass filter (LPF) of 50 kHz around 0 kHz (e.g. from −50 kHz to 50 kHz) with a finite impulse response (FIR) of 25-taps. In one embodiment, a low-pass filter is combined with a band-pass filter to shift each signal to zero (steps 416 and 420), and to filter out half of the signal to ensure the cleanest signal possible (steps 422, 418, and 424). Thus, three different frequency bands of 100 kHz may be processed by the beam-former as training signals as follows.

In steps 426, 428, and 430 the inverse of the N co-variance matrices of the 1$^{st}$ adjacent interference representative sample signals, ($R_{ii}^{-1}$, $R_{jj}^{-1}$), and the N co-variance matrix of the representative sample desired signal, $R_{ss}$ may be generated. Note that the matrices will be 2×2 matrices as there are two antennas in the array; the main diagonal will correspond to information about the interference or desired signal, and the secondary diagonal will correspond to information about the spatial correlation of the interference or desired signal (depending on which matrix is considered). Once the matrices are generated 426, 428, and 430, beam-former step 432, 434, 438 may nearly instantaneously calculate weights that maximize the Signal-to-Interference+Noise-Ratio (SINR) based on the inverse of the N co-variance matrices of the 1st adjacent interference representative sample signals and the N co-variance matrix of the representative sample desired signal, respectively. The co-variance matrix may be used as a measure for the signal power of the desired signal and of the interference signal. The beam former maximizes the signal for SINR, the maximum power of the desired signal and minimum contribution of the interference plus noise, because this will result in a determination of the directionality; this condition will correspond to the direction of origination of the signal. The weights may be computed nearly instantaneously using "estimation-and-plug" techniques by solving an eigenvalue problem with a "principal-component-analysis" (PCA) method as described below. Consequently, the complex base-band beam forming algorithm is fast, i.e., it has a low-latency.

As the weights are generated as illustrated by steps 416 through 434 in paths 406, 408, and 410, as illustrated in path 412 the lower 1st adjacent interference signal (note the frequency-bin of path 412 is 200 kHz wide, i.e., the channel-grid of the lower 1st adjacent), for example, signal 210, filtered from the N samples, may be obtained in the frequency-bin around −200 kHz, between −300 kHz and −100 kHz 436, where there may be great interference, for example, from the lower band 206 of the desired signal 202; and in the third path 414, the upper 1st adjacent interference signal, for example (as above, the frequency-bin of path 414 is 200 kHz wide, i.e., the channel-grid of the upper 1st adjacent), signal 212, filtered from the N samples, may be obtained in the frequency-bin around +200 kHz, between +100 kHz and +300 kHz 440, where there may be great interference, for example, from the upper band 208 of the desired signal 202. Note the portion of the desired signal, such as signal 204, in the middle path including step 458, the lower 1st adjacent interference signal, such as signal 210 in the path 412, and the upper 1st adjacent interference signal, such as signal 212 in the path 414, are 200 kHz wide. Note that the lower 1st adjacent interference signal, for example, signal 210, and the upper 1st adjacent interference signal, for example, signal 212, may be centered at steps 436 and 440 such that the signal is shifted to DC bias. As noted above, the desired frequency is shifted at step 402, so does not need to be shifted to the DC bias in subsequent steps. Thus, the method may proceed directly to step 458 from step 404, and in alternate embodiments may wait for steps 442 and 444 to run in parallel.

At steps 442, 458 and 444, each of the representatives of the frequency-shifted lower 1st adjacent interference signal, desired signal, and frequency-shifted upper 1st adjacent interference signal may be filtered using a low-pass filter (LPF) of 100 kHz around 0 kHz (e.g. from −100 kHz to 100 kHz) with a finite impulse response (FIR) of 21-taps; as a result, the filtered signal will include, for example, a desired signal such as signal 202, inclusive of analog band 204, lower digital sideband 206, and upper digital sideband 208. Note that fewer taps may be used in steps 442, 458 and 444 than in steps 418, 422, and 424 in order to generate a stronger/steeper training signal as a representative for the beam-former. Although in some embodiments the correction frequency-bins, i.e., lower-bin from −300 kHz to −100 kHz (path 412), the middle-bin from −100 kHz to +100 kHz (in the path including step 458), and the upper-bin from +100 kHz to 300 kHz (path 414) may not have as high selectivity as the training-signals in paths 406, 408, and 410, the number of taps may be a parameter that may be optimized to increase the accuracy of the training signals or correction frequencies.

At steps 446, 448, and 450 the weighting coefficients derived from the training signal at steps 432, 434, 438 may be combined with the lower, middle, and upper bands of the desired signal 202, respectively (as well as the lower interference 210 and the upper interference 212), derived at steps 442, 458, and 444. Note that there are two antennas, and the beam-forming for each antenna will result in a different weighting coefficient; thus, the low 446, middle 448, and high 450 coefficients will be applied 3×2 times with different weighting coefficients, which as noted are based on the Signal to Interference-plus-Noise ratios for each of the three frequency bands of 200 kHz wide each, i.e., the channel-grid, as discussed further below.

However, 3×2 weights will be calculated for the training signals at steps 432, 434, and 438; if there is no upper interference 208 the weights generated in step 434 and the weights calculated by step 438 will both be based on the desired signal and background noise, and thus they will look similar due to the lack of interference. For instance, in an example with only one lower-side 1st adjacent interference signal such as signal 210 and two results from the antennas' beam-former 434, 438, there may be six weights, i.e., six complex-numbers computed or estimated to be applied at steps 446, 448, and 450. Note the beam former 432, 434, 438 will perform the same steps regardless of whether interference is present or not. The SINR (if there is interference) or SNR (in cases without interference) optimization criterion will be applied in all cases so that the correct 3×2 weights will result regardless if there are none, one or two interference signals present. Thus, there may be three sets of complex numbers applied to signal 202. One set will be applied to enhance lower portion 206 446 (i.e., by reducing 210), another set will be applied to enhance middle portion 204 448, and yet another set will be applied to enhance upper portion 208 450 (i.e., by reducing 212). As an example, firstly, the two estimated complex-numbers (representing amplitude and phase estimates) may adjust the beam-pattern for the removal of the 1st adjacent lower-sided interference signal 446. Secondly, the beam-former may process the representative-information of the desired signal 202 to prevent null-steering to the desired signal, which are the second pair of weights, shown by the (mid) weighing-coefficients 448. More specifically, as an example, the beam-former may compute the weights of the second 1st adjacent interference signal, e.g., an upper FM-neighbor, to steer a null to the upper 1st adjacent interference-signal, shown by step 434.

Note that after combination of the upper, lower, and middle signals a complete signal of 600 kHz wide, i.e., from −300 kHz to +300 kHz, will result with interference substantially removed. Thus, for the lower frequency band two weighting coefficients based on the maximum Signal to Interference-plus-Noise ratio between the lower interference and the desired bands will be applied 446, and then the same for the higher interference and the desired bands 450, and then for the middle band no interference will be calculated to prevent self-nulling 448 as shown below. These signals may be combined to determine steering so that the received power of the desired signal may be improved 452, after which point the method will end 454.

The generation of weighting coefficients by complex digital base-band beam-forming with double-null steering by maximizing the SINR may be as follows. Note the estimation-criterion is the maximization of the SINR, which computes the optimal weights by taking the first derivative of the Signal-to-Interference+Noise-Ratio (SINR); the result of this derivative may be set to zero which may solve the equation. The SINR may be expressed as $$SINR \stackrel{def}{=} \frac{w^H R_{ss} w}{w^H R_{in} w} \quad \text{(equation 1)}$$

where w are the weights, $(\cdot)^H$ is the Hermitian transpose, i.e., both the complex-conjugate and the transpose operation, and $$R_{ss} \stackrel{\Delta}{=} \frac{1}{N}\sum_{n=1}^{N}(s[n]\cdot s^H[n]),$$

$$R_{in} \stackrel{\Delta}{=} \frac{1}{N}\sum_{n=1}^{N}(\{i[n]+n[n]\}\cdot$$

$\{i[n]+n[n]\}^H)$ (eq. 2) are the sample co-variance matrices (an approximation of the co-variance matrices over a finite number of samples N), and n[n] represents complex-Gaussian noise with zero-mean and variance $\sigma^2 = N_0$. In an example case the sample co-variance matrix $R_{in}$ may not be available, however, for an IBOC transmission the representative signals may be used to obtain an approximation of the sample co-variance matrix $R_{in}$ (and also for the sample co-variance matrix $R_{jn}$), yielding:

$$R_{in} \approx R_{ii} \stackrel{\Delta}{=} \frac{1}{N}\sum_{n=1}^{N}(\hat{i}[n]\cdot \hat{i}^H[n]) \quad \text{lower interference} \quad \text{(eq. 3)}$$

$$R_{ss} \approx R_{\hat{s}\hat{s}} \stackrel{\Delta}{=} \frac{1}{N}\sum_{n=1}^{N}(\hat{s}[n]\cdot \hat{s}^H[n]) \quad \text{desired signal}$$

$$R_{jn} \approx R_{jj} \stackrel{\Delta}{=} \frac{1}{N}\sum_{n=1}^{N}(\hat{j}[n]\cdot \hat{j}^H[n]) \quad \text{upper interference}$$

where $\hat{i}[n]$ is the stream of samples for the surrogate of the lower $1^{st}$ adjacent interference signal, $\hat{s}[n]$ is the stream of samples for the surrogate of the desired signal, and $\hat{j}[n]$ is the stream of samples for the surrogate of the upper $1^{st}$ adjacent interference signal.

An IBOC transmission with two $1^{st}$ adjacent interference signals (and, in some embodiments, complex-Gaussian noise) may be expressed as a summation of three spatial different and independent signals, i.e., the lower $1^{st}$ adjacent interference signal, the desired signal, and the upper $1^{st}$ adjacent interference signal with independent complex-Gaussian noise. Thus, the SINR may be expressed as $$SINR_{HIBOC} \stackrel{def}{=} \quad \text{(eq. 4)}$$

$$E\left\{\frac{w^H R_{ss} w}{w^H R_{inj} w}\right\} \approx \frac{1}{3}\left(\frac{w_i^H R_{ss} w_i}{w_i^H R_{ii} w_i} + \frac{w_s^H R_{ss} w_s}{w_s^H R_{nn} w_s} + \frac{w_j^H R_{ss} w_j}{w_j^H R_{jj} w_j}\right)$$

where $E\{\cdot\}$ is an expression of the statistical average. The optimum weighing-coefficients, i.e., the weight-vector may be obtained by maximizing the SINR, $$w_{opt} \stackrel{def}{=} \arg\max_w \{SINR\} = \arg\max_w \left\{\frac{w^H R_{ss} w}{w^H R_{in} w}\right\}. \quad \text{(eq. 5)}$$

For a received IBOC transmission, such as transmission 200, the interference-signals 210, 212 and the desired signal 202 may be separated into different frequency-bins, so that for each frequency-bin the SINR will be optimized to obtain the weights, such that $$w_{opt,i} \stackrel{def}{=} \arg\max_{w_i} \left\{ \frac{w_i^H R_{ss} w_i}{w_i^H R_{ii} w_i} \right\} \text{ lower interference} \quad \text{(eq. 6)}$$

$$w_{opt,s} \stackrel{def}{=} \arg\max_{w_s} \left\{ \frac{w_s^H R_{ss} w_s}{w_s^H R_{nn} w_s} \right\} \text{ desired signal}$$

$$w_{opt,j} \stackrel{def}{=} \arg\max_{w_j} \left\{ \frac{w_j^H R_{ss} w_j}{w_j^H R_{jj} w_j} \right\} \text{ upper interference}$$

which may be considered the initial step to calculate the weighting coefficients in three sub-bands. To solve the maximization problem the complex gradient of the SINR for each bin may be taken with respect to the complex-weights and the result set to zero, which yields, for example, for the lower 1st adjacent interference signal $$\nabla_{w_i^H} \left\{ \frac{w_i^H R_{ss} w_i}{w_i^H R_{ii} w_i} \right\} = \nabla_{w_i^H} \left\{ (w_i^H R_{ss} w_i)(w_i^H R_{ii} w_i)^{-1} \right\} = 0 \quad \text{(eq. 7)}$$

where $\nabla\{\bullet\}$ is the expression for taking the complex gradient. Applying partial-differentiation may result in $R_{ss}w_i(w_i^H R_{ii} w_i)^{-1} - (w_i^H R_{ii} w_i)^{-2} R_{ii} w_i (w_i^H R_{ss} w_i) = 0$ (eq. 8), which may be rewritten as the expression $$R_{ss} w_i (w_i^H R_{ii} w_i)^{-1} = \quad \text{(eq. 9)}$$

$$(w_i^H R_{ii} w_i)^{-2} R_{ii} w_i (w_i^H R_{ss} w_i) \Rightarrow R_{ss} w_i = R_{ii} w_i \frac{w_i^H R_{ss} w_i}{w_i^H R_{ii} w_i} \stackrel{\Delta}{=} R_{ii} w_i \lambda_i$$

where $$\lambda_i \stackrel{def}{=} \frac{s}{i+n} = \frac{w_i^H R_{ss} w_i}{w_i^H R_{ii} w_i} \quad \text{(eq. 10)}$$

may be defined as the SINR of the frequency-bin for the lower 1st adjacent interference signal. This may be rewritten as $R_{ss}w_i = R_{ii}w_i\lambda_i \Rightarrow (R_{ii}^{-1}R_{ss})w_i = \lambda_i w_i$ (eq. 11) which is an Eigen-value problem whose solution provides the optimal weights for maximizing the SINR: $w_{opt,i} = P\{R_{ii}^{-1}R_{ss}\}$ (eq. 12), where $P\{\bullet\}$ is the operator that returns the principal Eigen-vector of a matrix based on the PCA.

With a two-antenna ULA, the sample co-variance matrix may be a 2-by-2 matrix and the characteristic-function to compute the Eigen-vectors is a quadratic-function expressed as $\lambda^2 -$ $$tr\{A\}\lambda + \det\{A\} = 0 \Rightarrow \lambda_{1,2} = \frac{tr\{A\} \pm \sqrt{tr\{A\}^2 - 4 \cdot \det\{A\}}}{2} \quad \text{(eq. 13)}$$

where $A \triangleq R_{ii}^{-1} R_{ss}$, $tr\{A\}$ is the trace of matrix A, and $\det\{A\}$ is the determinant of matrix A.

Similar results may be derived in a similar-way for the desired signal and the upper 1st adjacent interference signal. However, the sample co-variance matrix $R_{nn}$ of independent zero-mean complex-Gaussian noise variables may be assumed to be a diagonal-matrix with noise variances $\sigma^2$ on the main-diagonal. Note the desired signal may not have an interference signal (one reason why it is used for the training signal). Because there is no interference self-nulling may be prevented—where there is no co-variance matrix from training there is no training signal—only the desired signal itself, absent of interference (other than un-correlated and/or white noise). By taking the inverse of the noise-matrix there will be values only on the main diagonal, such that the desired signal will be scaled, but will not change the Eigen-vectors. Therefore, the inverse sample covariance matrix $R_{nn}^{-1}$ may also be expressed as a diagonal matrix and $R_{nn}^{-1}R_{ss} \propto R_{ss} \Rightarrow w_{opt,s} = P\{R_{nn}^{-1}R_{ss}\} \propto P\{R_{ss}\}$ (eq. 14). Finally, the optimal weights for the lower and upper 1st adjacent interference signal and the desired signal may be expressed as $$w_{opt,i} = P\{R_{ii}^{-1} R_{ss}\} \text{ lower interference}$$

$$w_{opt,s} = P\{R_{ss}\} \text{ desired signal}$$

$$w_{opt,j} = P\{R_{jj}^{-1} R_{ss}\} \text{ upper interference} \quad \text{(eq. 15)}$$

where the Eigen-vectors are computed by solving "straight-forward" quadratic characteristic-functions for each of the three frequency-bins.

Thus, for a hybrid or all-digital IBOC transmission, representative information such as $R_{ii}$, $R_{ss}$, and $R_{jj}$ may be made available by taking the sample-average and appropriately filtering the received baseband IBOC-signal including the $1^{st}$ adjacent signals, i.e., a baseband signal with a bandwidth of roughly 600 kHz between −300 kHz and +300 kHz such as signal 300. The appropriate surrogate-signals may be obtained through filtering as shown in steps 416-424. In addition, from the training-signals/surrogate-signals the required training information for the desired signals as well as the training information for the interference signals may be computed. Due to the availability of this required training information for the lower $1^{st}$ adjacent interference signal in the form of a first sample co-variance matrix ($R_{ii}$), the desired signal with a second sample co-variance matrix ($R_{ss}$), and the upper $1^{st}$ adjacent interference signal with a third sample co-variance matrix ($R_{jj}$) a fast, i.e., low-latency ("estimation-and-plug"), low-complexity (inverse of a two-by-two matrix, solving a quadratic characteristic function), and accurate (three frequency-bin filtering) complex base-band beam forming with double-null-steering may be applied to remove, or significantly reduce, $1^{st}$ adjacent interference signals on a transmitted IBOC-signal. As such, the power of the received signal-power of the desired IBOC-signal may be improved with minimum latency (delay) and, since existing receiving equipment may be utilized to implement the filtering, at low cost.

Figure 5:
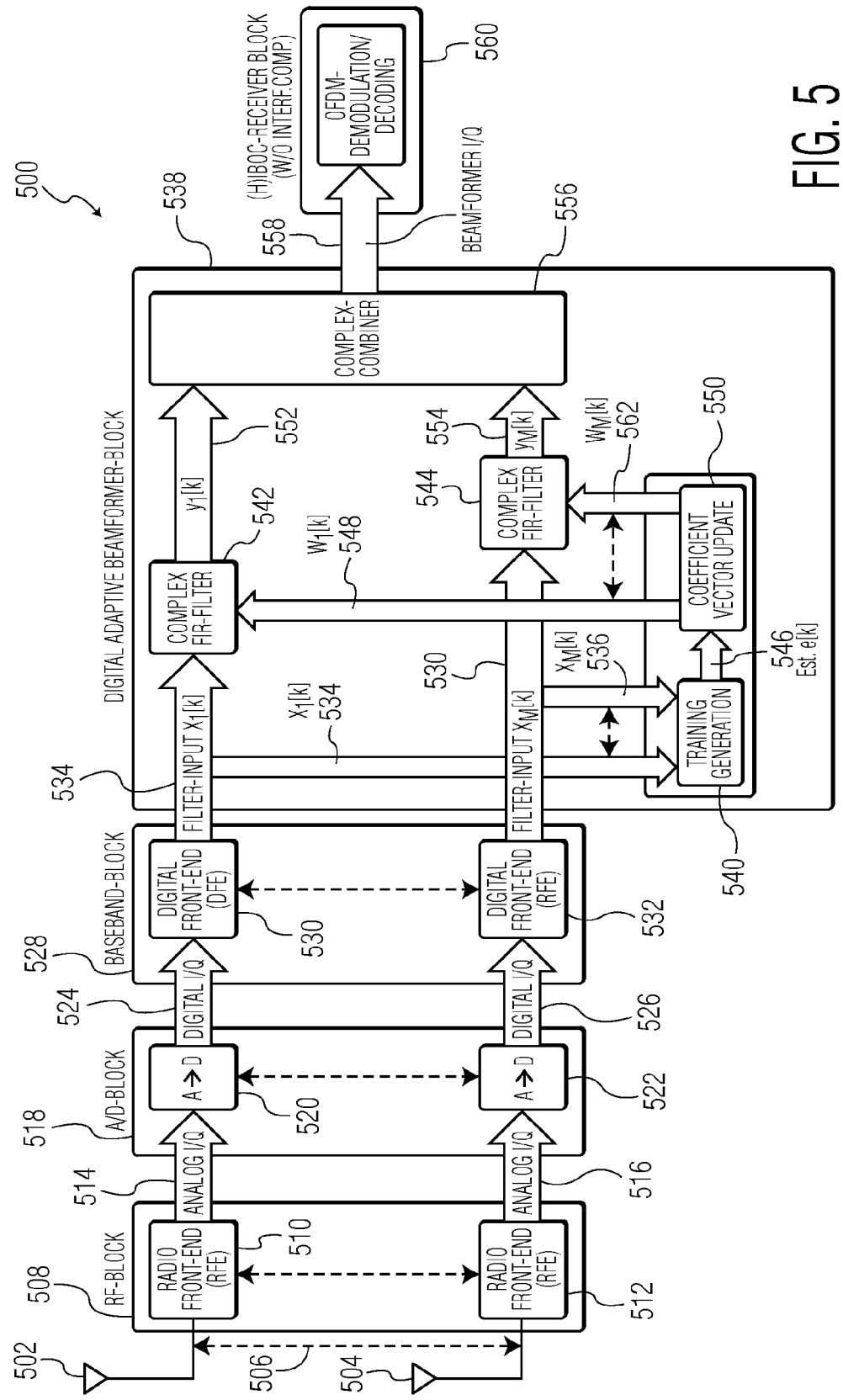
FIG. 5 illustrates an exemplary hardware diagram of a device for performing electronically-steered complex base-band beam forming with double-null-steering.

FIG. 5 illustrates an exemplary hardware diagram for a device 500 for performing electronically-steered complex base-band beam forming with double-null-steering such as exemplary method 400. Device 500 may be connected to an antenna array 502, 504, including two or more antennas spaced by half a wave-length 506. The antennas 502, 504 may be connected to a first so-called RF-block 508 that may include one or multiple radio-frontends 510, 512, which may be equal in number to the number of antennas used in the array 502, 504 (e.g., two antennas). Each radio-frontend 510, 512 may down-convert received IBOC signals to base-band In-phase (I) and quadrature (Q) signals, 514, 516, such that the signal received at antenna array 502, 504 are on the carrier-frequency (e.g., the USA FM-broadcast band from 87.9 to 107.9 MHz with channel-grid sizes of 200 kHz) to complex I/Q base-band signals around 0 MHz 514, 516.

The I/Q base-band signals 514, 516 may be sent to an A/D-block 518 that may include one or multiple analog-to-digital converters 520, 522 (which may be equal in number to the number of antennas used in the array 502, 504) to digitize the analog base-band I/Q-signals 514, 516 into samples in discrete time 524, 526, for example, every clock-cycle two samples (I and Q) 524, 526, per antenna-branch 502, 504, may be generated by each A/D-converter block 518.

Digital I/Q-signals 524, 526 may be sent to a base-band block 528, that may filter, per antenna-branch 530, 532, to obtain the required base-band input-signals 534, 536, for example, such as an exemplary signal 300, for the next block 538, which may be referred to as the digital adaptive beam-former block 538, or beam-former 538. Base-band block 528 may perform operations corresponding to step 402 of method 400 such that the inputs to beam former block 538 are 534 and 536, i.e., a signal such as signal 300 may be the input 534, 536 of beam former 538.

As may be seen below, within digital-adaptive beam-former block 538 the training-generation block 540 and coefficient-update block 550 roughly correspond to steps 406-410, 416-434, and 438 of method 400, and the complex-FIR filters 542, 544 roughly correspond to steps 412-414, 436, 440-450, and 458 of method 400. Signal $x_1[n]$ 534 may be an input to the beam-former 538 originating from the 1st-antenna branch 502, 514, 524, and $x_M[n]$ 536 may be an input to the beam-former 538 coming from the M-th antenna branch 504, 516, 526. Thus, with a two-antenna approach $x_M[n]$ will be $x_2[n]$, and so the inputs 534, 536 to block 538 will include $x_1[n]$ and $x_2[n]$ 534, 536. Note that the equivalent time-index n in equations 1-15 may be equivalent to index n in the beam-former block 538. Signals $x_1[n]$ and $x_2[n]$ 534, 536 represent the inputs to the beam-former 538, and, in the case where the array includes two antennas, are related to equations 1-15 above by $x_1[n]=s_1[n]+i_1[n]+j_1[n]$ for the $1^{st}$ antenna-branch and $x_2[n]=s_2[n]+i_2[n]+j_2[n]$ for the $2^{nd}$ antenna-branch. In other words, for the two-antenna case, the relation with equations 1-15 above is $x[n]=s[n]+i[n]+j[n]$, which may be derived from the input pair of signals $(x_1[n], x_2[n])=(s_1[n]+i_1[n]+j_1[n], s_2[n]+i_2[n]+j_2[n])$.

The down-converted signal 300 may illustrate a power-spectral-density of input-signal $x_1[n]$, and the down-converted signal power-spectral-density of $x_2[n]$ would appear the same, but actually would be shifted by half a wavelength. Signals $x_1[n]$ 534 through $x_M[n]$ 536 (which in a two-antenna array will be $x_2[n]$) may enter the beam-former 538 to generate training signals 540 as described in paths 406, 408, and 410 above, and to be filtered and combined (542, 544)—filtered to isolate the portions of the frequency including a desired signal such as signal 202, inclusive of an analog band 204, a lower digital sideband 206, and an upper digital sideband 208, as described above with respect to steps 436, 440, 442, 444, and 458, and combined with weighting coefficients generated from the training signals as in steps 446, 448, and 450 of method 400.

The estimated surrogate/training signal $\hat{e}[n]$ 546 may represent the training/surrogate $\hat{i}[n]$ (lower-surrogate signal), $\hat{j}[n]$ (upper-surrogate signal), and $\hat{s}[n]$ (middle-surrogate signal) given in equations 2 and 3 above and output by steps 418, 422, 424, 426, 428, and 430 of method 400.

The computed/estimated coefficients $w_1[n]$ 548 through $w_M[n]$ 562 (which may reflect a computation-rate on sample basis n) may correspond to the computed/estimated optimal weighing-coefficients $w_{opt,i}$, $w_{opt,s}$, and $w_{opt,j}$ as shown in equation 15 above, and may reflect the outputs of steps 432, 434, and 438 of method 400. Similarly, after signals $x_1[n]$ 534 through $x_M[n]$ 536 (which in a two-antenna array will be $x_2[n]$) enter the beam-former 538 and are filtered and combined 542, 544, the resulting output signals $y_1[n]$ 552 through $y_M[n]$ 554 may represent the input signals of $x_1[n]$ 534 through $x_M[n]$ 536, respectively, corrected/compensated by the computed weights $w_{opt,i}$, $w_{opt,s}$ and $w_{opt,j}$, corresponding to steps 446, 448, and 450 of method 400. Signals $y_1[n]$ through $y_M[n]$ may be input to the complex combiner 556 to determine steering so that the received power of the desired signal may be improved as may be shown in step 452 of method 400.

The complex combiner 556 may output a beamformer I/Q signal 558, which may correspond to the output of step 452 of method 400. The beamformer I/Q signal 558 may be input to the so-called (H)IBOC-receiver block (without interference compensation) 560 which may be a (H)IBOC receiver that performs OFDM demodulation and decoding without a 1st-adjacent interference compensation, since the beam-forming has instead performed the task of compensating for interference.

Figure 6:
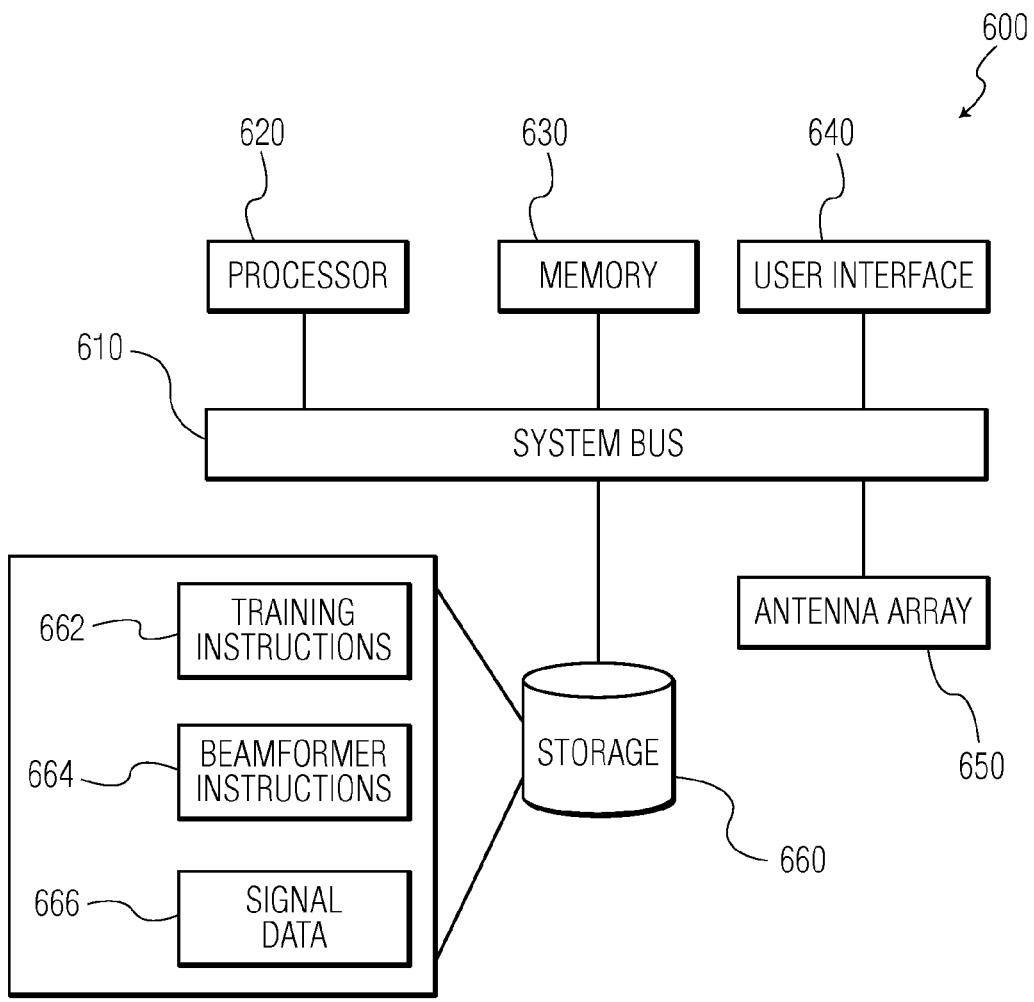
FIG. 6 illustrates an exemplary hardware diagram for a device including hardware for performing electronically-steered complex base-band beam forming with double-null-steering.

FIG. 6 illustrates an exemplary hardware diagram for a device 600 including hardware for performing electronically-steered complex base-band beam forming with double-null-steering. The exemplary device 600 may include elements of device 500. As shown, the device 600 includes a processor 620, memory 630, user interface 640, antenna array 650, and storage 660 interconnected via one or more system buses 610. It will be understood that FIG. 6 constitutes, in some respects, an abstraction and that the actual organization of the components of the device 600 may be more complex than illustrated.

The processor 620 may be any hardware device capable of executing instructions stored in memory 630 or storage 660. As such, the processor may include a microprocessor, field programmable gate array (FPGA), application-specific integrated circuit (ASIC), or other similar devices.

The memory 630 may include various memories such as, for example L1, L2, or L3 cache or system memory. As such, the memory 630 may include static random access memory (SRAM), dynamic RAM (DRAM), flash memory, read only memory (ROM), or other similar memory devices.

The user interface 640 may include one or more devices for enabling communication with a user such as an administrator. For example, the user interface 640 may include a display and an input for receiving user commands.

The antenna array 650 may include one or more devices for enabling reception of transmissions. For example, the antenna array 650 may include a radio front end and a receiver block for demodulation and decoding as explained above. Additionally, the antenna array 650 may include an RF/IF receiver and an ADC/baseband processor. Various alternative or additional hardware or configurations for the antenna array 650 will be apparent.

The storage 660 may include one or more machine-readable storage media such as read-only memory (ROM), random-access memory (RAM), magnetic disk storage media, optical storage media, flash-memory devices, or similar storage media. In various embodiments, the storage 660 may store instructions for execution by the processor 620 or data upon with the processor 620 may operate. For example, the storage 660 may store Training Instructions 662 for performing generation of a training signal, or Beamformer Instructions 664 for complex combinations of weighted coefficients and received signals according to the concepts described herein. The storage 660 may also store Signal Data 666 for use by the processor executing the Training or Beamformer Instructions 662, 664.

According to the foregoing, various exemplary embodiments provide for low-complexity, low-cost, and low-latency (fast acquisition) improved reception of in-band on-channel transmissions through suppression or removal of the 1st adjacent interference-signals and improvement of the received signal-power of the desired signal, whether transmitted in hybrid-mode or all-digital mode. In particular, by performing electronically-steered complex base-band beam forming with double-null-steering to remove or significantly reduce the first adjacent FM-interference signals by double-null-steering with an Uniform-Linear-Antenna-array (ULA) consisting of two isotropic antennas that are spaced by half a wave-length, exploiting the fact that both the first adjacent FM-interference signals as well as the desired IBOC-signal are separated in three different frequency bins, each of a known width, e.g. 200 kHz wide. More specifically, using a portion of roughly 100 kHz wide (a frequency-bin of 100 kHz) to obtain training-signal or surrogate-signal representatives of the desired IBOC-signal, the lower first adjacent FM-interference signal, and the upper first adjacent FM-interference-signal, which training-signals or surrogate-signals may be used to compute optimal steering-weights, i.e., the optimal steering-weight vector, based on maximization of the SINR, which is an average of the SINR of each of the three frequency-bins corresponding to the desired IBOC signal and the two 1st adjacent FM-interference signals.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or a processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method for improving reception of transmissions with first adjacent interference signals, the method comprising:
   selecting, with one or more baseband blocks, a plurality of time samples from each of two or more antennas;
   generating, with a training block, a lower first adjacent interference (LFAI) signal, a desired signal, and an upper first adjacent interference (UFAI) signal for the plurality of time samples as a plurality of training signals;
   calculating, with a coefficient-update block, a lower weighting co-efficient based on the LFAI signal;
   calculating, with the coefficient-update block, a middle weighting co-efficient based on the desired signal;
   calculating, with the coefficient-update block, an upper weighting co-efficient based on the UFAI signal;
   combining, with one or more finite impulse response (FIR) filter blocks, the lower weighting co-efficient with a filtered LFAI signal into a weighted lower signal;
   combining, with the one or more finite impulse response (FIR) filter blocks, the middle weighting co-efficient with a filtered desired signal into a weighted middle signal;
   combining, with the one or more finite impulse response (FIR) filter blocks, the upper weighting co-efficient with a filtered UFAI signal into a weighted upper signal; and
   combining, with a combiner block, the weighted lower signal, the weighted middle signal, and the weighted upper signal to output a beamformer I/Q signal.

2. The method of claim 1, wherein calculating the lower weighting co-efficient based on the LFAI signal further comprises:
   shifting the LFAI signal to zero; and calculating the upper weighting co-efficient based on the UFAI signal further comprises:
   shifting the UFAI signal to zero.

3. The method of claim 1, wherein calculating the lower weighting co-efficient based on the LFAI signal further comprises:
   filtering the LFAI signal to include the lowest half of the LFAI signal; calculating a middle weighting co-efficient based on the desired signal further comprises:
   filtering the desired signal to include the middle portion of the desired signal which comprises half the desired signal; and calculating the upper weighting co-efficient based on the UFAI signal further comprises:
   filtering the UFAI signal to include the upper-most half of the LFAI signal.

4. The method of claim 1, wherein calculating the lower weighting co-efficient based on the LFAI signal further comprises:
   generating an inverse co-variance matrix based on the LFAI signal; calculating a middle weighting co-efficient based on the desired signal further comprises:
   generating an inverse co-variance matrix based on the desired signal; and calculating the upper weighting co-efficient based on the UFAI signal further comprises:
   generating an inverse co-variance matrix based on the UFAI signal.

5. The method of claim 1, wherein calculating the lower weighting co-efficient based on the LFAI signal further comprises:
   calculating a lower weighting co-efficient that maximizes the Signal-to-Interference-plus-Noise-Ratio (SINR) of the LFAI signal; calculating a middle weighting co-efficient based on the desired signal further comprises:
   calculating a middle weighting co-efficient that maximizes the SINR of the desired signal; and calculating the upper weighting co-efficient based on the UFAI signal further comprises:
   calculating an upper weighting co-efficient that maximizes the SINR of the UFAI signal.

6. The method of claim 1, further comprising:
generating a filtered LFAI signal;
generating a filtered desired signal; and
generating a filtered UFAI signal.

7. The method of claim 6, wherein generating the filtered LFAI signal further comprises:
shifting the LFAI signal to zero; and generating the filtered UFAI signal further comprises:
shifting the UFAI signal to zero.

8. The method of claim 7, wherein generating the filtered LFAI signal further comprises:
filtering the LFAI signal to include a lower digital sideband; generating the filtered desired signal further comprises:
filtering the desired signal to include an analog band; and generating the filtered UFAI signal further comprises:
filtering the UFAI signal to include an upper digital sideband.

9. A device for improving reception of transmissions with first adjacent interference signals, the device comprising:
an antenna array comprising two or more antennas;
a radio front-end block comprising one or more radio front ends connected to each of the two or more antennas;
one or more analog-to-digital converters connected to the one or more radio front-ends;
one or more baseband blocks connected to the one or more analog-to-digital converters; and
a digital adaptive beam-former block connected to each of the one or more baseband blocks
the digital adaptive beam-former block further comprising:
a training block connected to each of the one or more baseband blocks;
a coefficient-update block connected to the training block;
one or more finite impulse response (FIR) filter blocks connected to the coefficient-update block and each of the one or more baseband blocks; and
a combiner block connected to each of the one or more FIR filter blocks; and wherein
the one or more baseband blocks are configured to select a plurality of time samples from each of the two or more antennas;
the training block is configured to
generate a lower first adjacent interference (LFAI) signal for the plurality of time samples,
generate a desired signal for each of the plurality of time samples, and
generate an upper first adjacent interference (UFAI) signal for each of the a plurality of time samples; and
the coefficient-update block is configured to
calculate a lower weighting co-efficient based on the LFAI signal,
calculate a middle weighting co-efficient based on the desired signal, and
calculate an upper weighting co-efficient based on the UFAI signal.

10. The device of claim 9, wherein:
the coefficient-update block is further configured to generate an inverse co-variance matrix based on the LFAI signal, generate an inverse co-variance matrix based on the desired signal, and generate an inverse co-variance matrix based on the UFAI signal.

11. The device of claim 9, wherein: the coefficient-update block is further configured to
calculate a lower weighting co-efficient that maximizes the Signal-to-Interference-plus-Noise-Ratio (SINR) of the LFAI signal,
calculate a middle weighting co-efficient that maximizes the SINR of the desired signal, and
calculate an upper weighting co-efficient that maximizes the SINR of the UFAI signal.

12. The device of claim 9, wherein: the one or more finite impulse response (FIR) filter blocks is configured to
generate a filtered lower first adjacent interference (LFAI) signal,
generate a filtered desired signal, and
generate a filtered upper first adjacent interference (UFAI) signal.

13. The device of claim 12, wherein: the one or more finite impulse response (FIR) filter blocks is further configured to
shift the LFAI signal to zero, and
shift the UFAI signal to zero.

14. The device of claim 12, wherein: the one or more finite impulse response (FIR) filter blocks is further configured to
filter the LFAI signal to include a lower digital sideband,
filter the desired signal to include an analog band, and
filter the UFAI signal to include an upper digital sideband.

15. The device of claim 12, wherein: the one or more finite impulse response (FIR) filter blocks is further configured to
combine a lower weighting co-efficient with the filtered LFAI signal into a weighted lower signal,
combine a middle weighting co-efficient with the filtered desired signal into a weighted middle signal, and
combine the upper weighting co-efficient with the filtered UFAI signal into a weighted upper signal.

16. The device of claim 9, wherein
the one or more baseband blocks is configured to select a plurality of time samples from each of the two or more antennas;
the training block is configured to
generate a lower first adjacent interference (LFAI) signal for each of the plurality of time samples,
generate a desired signal for each of the plurality of time samples, and
generate an upper first adjacent interference (UFAI) signal for each of the plurality of time samples;
the coefficient-update block is configured to
calculate a lower weighting co-efficient based on the LFAI signal,
calculate a middle weighting co-efficient based on the desired signal, and
calculate an upper weighting co-efficient based on the UFAI signal;
the one or more finite impulse response (FIR) filter blocks is configured to
generate a filtered LFAI signal,
generate a filtered desired signal,
generate a filtered UFAI signal,
combine the lower weighting co-efficient with the filtered LFAI signal into a weighted lower signal,
combine the middle weighting co-efficient with the filtered desired signal into a weighted middle signal,
combine the upper weighting co-efficient with the filtered UFAI signal into a weighted upper signal; and
the combiner block is configured to combine the weighted lower signal, the weighted middle signal, and the weighted upper signal to output a beamformer I/Q signal.

17. A device for improving reception of transmissions with first adjacent interference signals, the device comprising:
an antenna array comprising two or more antennas;
a radio front-end block comprising one or more radio front ends connected to each of the two or more antennas;
one or more analog-to-digital converters connected to the one or more radio front-ends;

one or more baseband blocks connected to the one or more analog-to-digital converters; and a digital adaptive beam-former block connected to each of the one or more baseband blocks;

wherein the one or more baseband blocks are configured to select a plurality of time samples from each of the two or more antennas;

the digital adaptive beam-former block configured to:
generate a lower first adjacent interference (LFAI) signal, a desired signal, and an upper first adjacent interference (UFAI) signal for each of the plurality of time samples;

calculate a lower weighting co-efficient based on the LFAI signal;

calculate a middle weighting co-efficient based on the desired signal;

calculate an upper weighting co-efficient based on the UFAI signal;

combine the lower weighting co-efficient with a filtered LFAI signal into a weighted lower signal;

combine the middle weighting co-efficient with a filtered desired signal into a weighted middle signal;

combine the upper weighting co-efficient with a filtered UFAI signal into a weighted upper signal; and combine the weighted lower signal, weighted middle signal, and weighted upper signal to output a beam-former I/Q signal.

* * * * *